US012732694B2

(12) United States Patent
Tan et al.

(10) Patent No.: US 12,732,694 B2
(45) Date of Patent: Sep. 8, 2026

(54) DEVICE, METHOD AND SYSTEM FOR DISABLING MOTORS THAT MOVE A CAMERA

(71) Applicant: MOTOROLA SOLUTIONS, INC., Chicago, IL (US)

(72) Inventors: Chun Meng Tan, Bayan Lepas (MY); Kwang Chun Oh, Georgetown (MY); Syed Isa Syed Idrus, Bayan Lepas (MY); Kong Chin Chee, Balik Pulau (MY); Jose Maria Macias, Boadilla del Monte (ES)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 157 days.

(21) Appl. No.: 18/830,180

(22) Filed: Sep. 10, 2024

(65) Prior Publication Data

US 2026/0075313 A1 Mar. 12, 2026

(51) Int. Cl.

| | |
|---|---|
| ***H04N 23/66*** | (2023.01) |
| ***H04N 23/11*** | (2023.01) |
| ***H04W 4/80*** | (2018.01) |

(52) U.S. Cl.

CPC ............. *H04N 23/66* (2023.01); *H04N 23/11* (2023.01); *H04W 4/80* (2018.02)

(58) Field of Classification Search

CPC ...... H04N 23/66; H04N 23/11; H04N 23/695; H04W 4/80

USPC ....................................................... 348/211.6

See application file for complete search history.

(56) References Cited

U.S. PATENT DOCUMENTS

| | | | | |
|---|---|---|---|---|
| 8,762,704 | B2 | 6/2014 | Rothkopf et al. | |
| 9,089,059 | B1 | 7/2015 | Haskin et al. | |
| 2008/0202213 | A1 | 8/2008 | Mllers et al. | |
| 2016/0052703 | A1 | 2/2016 | Weidner | |
| 2022/0335587 | A1 * | 10/2022 | Hama | G06T 7/001 |
| 2024/0414426 | A1 * | 12/2024 | Fee | H04N 23/66 |
| 2025/0158975 | A1 | 5/2025 | Norys et al. | |

FOREIGN PATENT DOCUMENTS

| | | | |
|---|---|---|---|
| CN | 205430407 | U | 8/2016 |
| KR | 102240844 | B1 | 4/2021 |

* cited by examiner

*Primary Examiner* — Lin Ye
*Assistant Examiner* — Chan T Nguyen
(74) *Attorney, Agent, or Firm* — PERRY + CURRIER INC.

(57) ABSTRACT

A controller of an apparatus receives, via a connector of the apparatus, power, and, after receiving the power via the connector, the controller receives, from one or more sensors of the apparatus, sensor data indicative of whether or not a camera of the apparatus is inside packaging. The controller determines, from the sensor data, that the camera is inside the packaging. In response to determining from the sensor data, that the camera is inside the packaging, the controller disables one or more motors of the apparatus from moving the camera, and/or the controller disables at least one or more start-up processes of the apparatus and/or changes a start-up process of the apparatus from a full start-up process to a limited start-up process in which one or more processes of the full start-up process are not implemented and/or are disabled.

18 Claims, 7 Drawing Sheets

DEVICE, METHOD AND SYSTEM FOR DISABLING MOTORS THAT MOVE A CAMERA

BACKGROUND OF THE INVENTION

Some cameras are provided in packaging to protect them from damage but while the camera is packed the camera is inherently less accessible than when unpacked.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
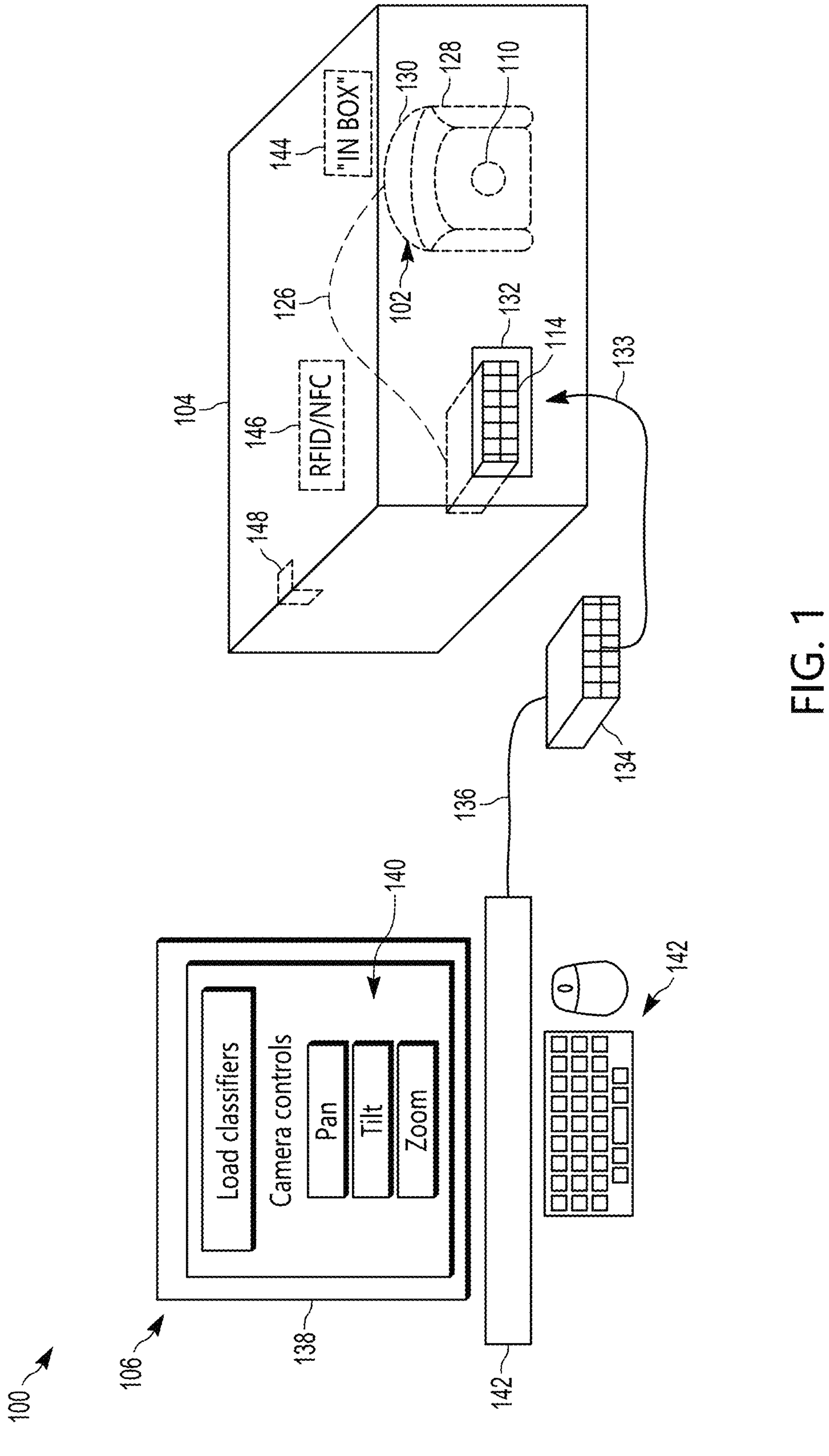
FIG. 1 is a system for disabling motors that move a camera, and includes an apparatus for disabling motors that move a camera that is provided in packaging, and a computing device connectable to the apparatus in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Some cameras are provided in packaging that allows for in-box configuration, for example via an aperture in the packaging. However when connecting a camera to a computing device for such in-box configuration, motors that move the camera, for example to pan, zoom and/or tilt the camera, may initiate an automatic homing process as part of a power up procedure. For example, the camera may be supported by a gimbal of a housing, and the like, and may be moveable relative to the housing. However, when such automatic homing occurs while the camera is in the packaging, especially when panning and tilting, the camera (and/or the packaging) may be damaged. Hence, what is needed is an improved technical method, device, and system for disabling motors that move a camera.

An aspect of the present specification provides a method comprising: receiving, at a controller of an apparatus, via a connector of the apparatus, power; after receiving the power via the connector, receiving, at the controller, from one or more sensors of the apparatus, sensor data indicative of whether or not a camera of the apparatus is inside packaging; determining, at the controller, from the sensor data, that the camera is inside the packaging; and in response to determining, at the controller, from the sensor data, that the camera is inside the packaging, disabling one or more motors of the apparatus from moving the camera.

An aspect of the present specification provides an apparatus comprising: a camera; one or more motors configured to move the camera; a connector configured to receive power; one or more sensors; a controller communicatively coupled to the camera, the one or more motors, the connector, and the one or more sensors; and a computer-readable storage medium having stored thereon program instructions that, when executed by the controller, causes the controller to perform a set of operations comprising: after receiving the power via the connector, receiving, from the one or more sensors, sensor data indicative of whether or not the camera is inside packaging; determining, from the sensor data, that the camera is inside the packaging; and in response to determining, from the sensor data, that the camera is inside the packaging, disable the one or more motors from moving the camera.

Each of the above-mentioned embodiments will be discussed in more detail below, starting with example system and device architectures of the system in which the embodiments may be practiced, followed by an illustration of processing blocks for achieving an improved technical method, device, and system for disabling motors that move a camera.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as “blocks” rather than “steps.”

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings. Herein communication links between components are depicted throughout the present specification, as double-ended arrows between respective components. Generally the communication links comprise wired links unless specifically indicated, though wireless links may occur in some examples.

Figure 2:
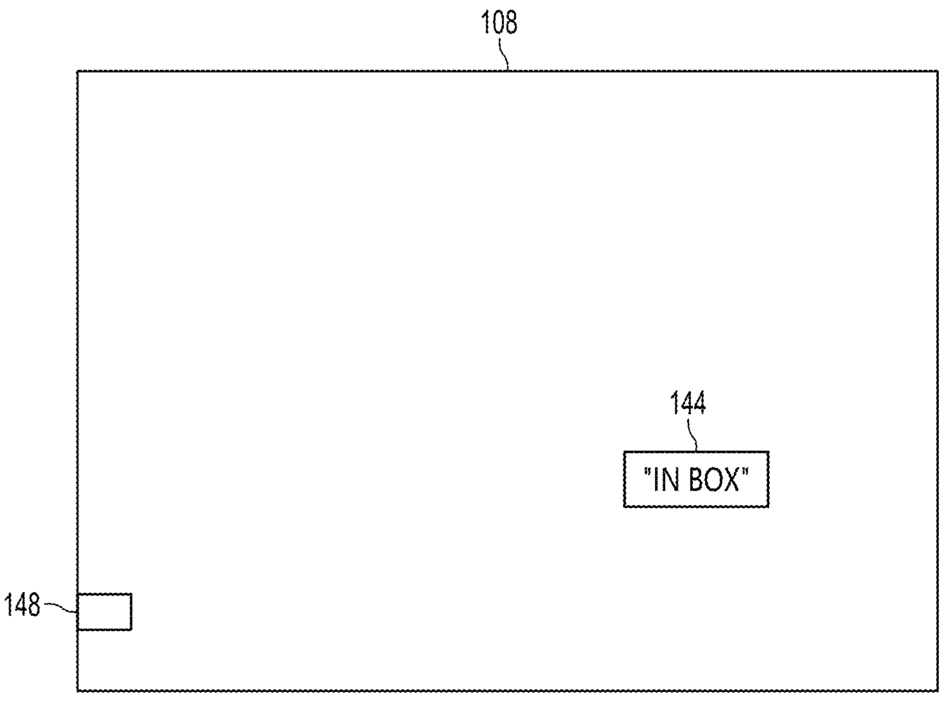
FIG. 2 depicts the apparatus for disabling motors that move a camera in the packaging, with a top portion of the packaging removed to show the apparatus, in accordance with some examples.
Figure 2:
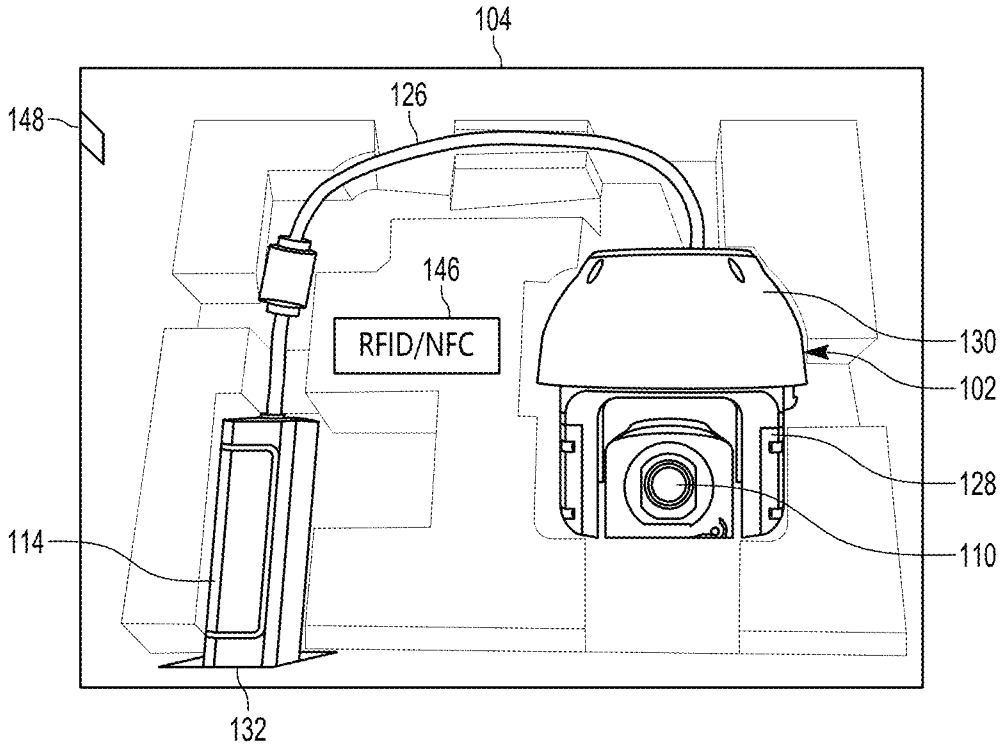
Figure 3:
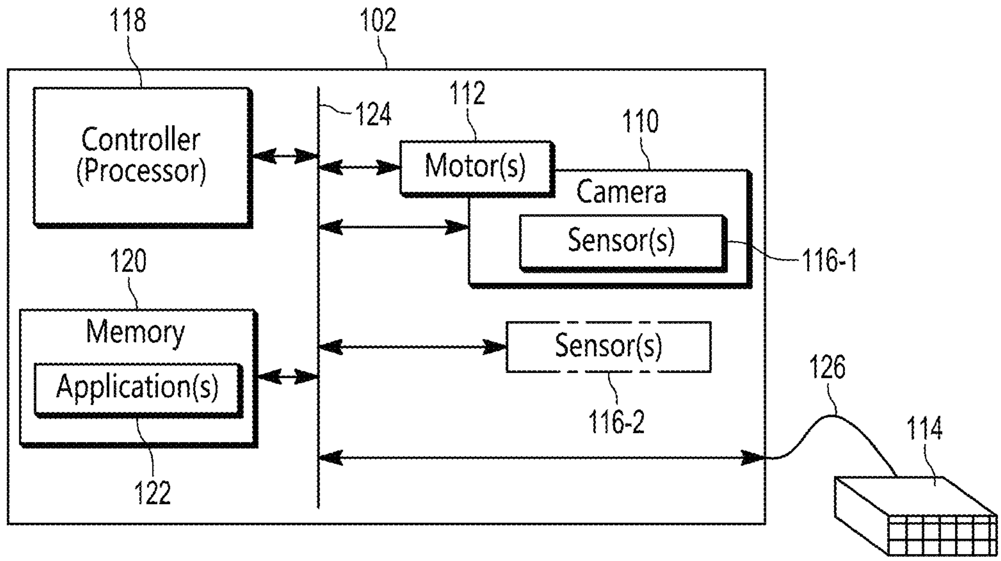
FIG. 3 is a device diagram showing structure of the apparatus for disabling motors that move a camera, in accordance with some examples.

Attention is directed to FIG. 1, FIG. 2 and FIG. 3. In particular, FIG. 1 depicts an example system 100 for disabling motors that move a camera, and includes an apparatus 102 for disabling motors that move a camera that is provided in packaging, 104, and a computing device 106 connectable to the apparatus 102, the computing device 106 being external to the apparatus 102. In FIG. 1, the apparatus 102, and other components within the packaging 104, are depicted in outline to indicate that the apparatus 102 and the other components are located within, and/or are surrounded by, the packaging 104. Furthermore, while in FIG. 1, the apparatus 102 is not facing a top portion 108 of the packaging 104, it is understood that FIG. 2 better depicts a packaged configuration of the apparatus 102.

In particular, FIG. 2 depicts the apparatus in the packaging 104, with a top portion 108 (e.g., a lid) of the packaging 104 removed to show the apparatus 102.

FIG. 3 is a device diagram showing structure of the apparatus 102.

As depicted, and with initial reference to FIG. 3, the apparatus 102 comprises a camera 110; one or more motors 112 configured to move the camera 110 (e.g., interchangeably referred to hereafter as the motors 112 for simplicity); a connector 114 configured to receive power, for example from the computing device 106, as described herein, and one or more sensors 116-1, 116-2. For simplicity, the one or more sensors 116-1, 116-2 are interchangeably referred to hereafter, collectively, as the sensors 116 and, generically, as a sensor 116. This convention will be used throughout the present specification.

Furthermore, as depicted in FIG. 3, it is understood that one or more sensors 116-1 may be components of the camera 110, and one or more sensors 116-2 may be components of the apparatus 102, but not components of the camera 110. In some examples, a sensor 116-1 may comprise an image sensor of the camera 110, that may be used herein to disable the motors 112 for moving the camera 110, as well as generally acquiring images. In some examples, a sensor 116-2 that is a component of the apparatus 102, but not a component of the camera 110, may be used to disable the one or more motors 112 for moving the camera 110, however such a sensor 116-2 may be optional when a sensor 116-1 of the camera 110 is used to implement such functionality. As such, the one or more sensors 116-2 are depicted in dashed lines to indicate such optionality.

Furthermore, the apparatus 102 comprises a controller 118, which may comprise one or more processors, and the like, and a memory 120 (e.g., a static memory) storing one or more applications 122. The components of the apparatus 102 are understood to be in communication via a common data and address bus 124.

While not depicted, the apparatus 102 may further comprise a communication interface, that may include one or more wireless transceivers, one or more wired and/or wireless input/output (I/O) interfaces (e.g., for communicating with the computing device 106, via the connector 114, as described herein), a random-access memory (RAM), a read-only memory (ROM), and the like.

The connector 114 may comprise a power-over-ethernet (POE) connector that is communicatively coupled to the common data and address bus 124 via a cable 126. Such POE connectors may include any suitable type of POE connector, including, but not limited to, POE+, POE++, and the like. Hence, it is understood that the connector 114 may be configured to both receive power from an external device, such as the computing device 106, and to communicate with external devices, such as the computing device 106. Indeed, as will be described herein, the computing device 106 may be used to configure the apparatus 102 while the apparatus 102 is in the packaging 104, while also providing power to the apparatus 102.

With attention next directed to FIG. 1 and FIG. 2, it is understood that the camera 110 may be mounted in a gimbal 128, and the like, that is attached to a housing 130, and the motors 112 are understood to be generally configured to move the camera 110 relative to the housing 130, for example to control the camera 110 to pan, tilt and/or zoom.

In general, the apparatus 102 may be located inside the packaging 104 in a packaged configuration, for example, with the camera 110 in a particular rest position, for example facing the top portion 108 of the packaging 104. When the apparatus 102 receives power, for example via the connector 114, the controller 118 may turn "on" and automatically control the motors 112 to pan and/or tilt and/or zoom the camera 110 in a homing process. However, when the apparatus 102 receives power, and the apparatus 102 is in the packaging, such a homing process may damage the apparatus 102 and/or the camera 110 and/or the packaging 104.

For example, the packaging 104 may comprise a box and packing materials (e.g., paper and/or polystyrene foam and/or any other suitable packing materials) within which the apparatus 102 is packaged. In particular, the packaging 104 comprises an aperture 132 through a wall of the packaging 104, and the connector 114 is positioned within the packaging 104 such that the connector 114 is accessible via the aperture 132. Indeed, the packing materials of the packaging 104 may include recesses and/or walls to specifically position the connector 114 at the aperture 132.

As such, the computing device 106 may be connected to the apparatus 102 via a respective connector 134 and cable 136 that connects to the connector 114 of the apparatus 102 via the aperture 132. While as depicted, the connectors 114, 134 are not connected, an arrow 133 generally indicates that the connector 134 may be plugged into, and/or connected to, the connector 114. When the connector 114 comprises a POE connector, the respective connector 134 may comprise a complementary POE connector.

Such a connection may occur when the computing device 106 is used to configure the apparatus 102 prior to installation. For example, the one or more applications 122 may include one or more video analysis engines (VAEs) that comprise respective software engines that analyze images acquired by the camera 110, and may be generally configured to "watch" the images and detect predetermined subjects and/or subject types, such as users, objects, and the like. In a particular example, a VAE of the one or more applications 122 may comprise one or more machine learning algorithms, and, to configure the apparatus 102, the computing device 106 may be connected to the apparatus 102 (e.g., via the connectors 114, 134) to load into the memory 120 classifiers, and the like used by a VAE to detect predetermined subjects and/or subject types, such as users, objects, and the like.

For example, a user of the computing device 106 may be an employee of a company that has ordered the apparatus 102 (and/or a plurality of same) for installation at a building, and the like, for example by mounting the apparatus 102 to the building. As such, prior to such installation, the apparatus 102 may be configured accordingly with classifiers, and the like, representing predetermined subjects and/or subject types such that are to be detected after installation.

Furthermore, as depicted, the computing device 106 comprises a display screen 138 at which a graphic user interface (GUI) 140 is depicted, which includes an electronic button for "Loading Classifiers" that, when selected, may cause the GUI 140 to provide controls to select classifiers, and the like, to load into the memory 120, when the computing device 106 is connected to the apparatus 102.

However, it is understood that the GUI 140 may not be specifically adapted only for configuring the apparatus 102 while in the packaging 104, but may be an all-purpose GUI for configuring and testing the apparatus 102, whether in the packaging 104 or after installation.

As such, the GUI 140 may be used for camera control and/or to control the motors 112 to control the camera 110, for example when the computing device 106 is connected to the apparatus 102 via the connectors 114, 134. For example, as depicted, the GUI 140 includes electronic camera controls to control the camera 110 to "Pan", "Tilt" and "Zoom" when the computing device 106 is connected to the apparatus 102 via the connectors 114, 134. When the electronic camera controls are actuated, the computing device 106 may provide associated commands to the apparatus 102 to control the motors 112 to move the camera 110 accordingly.

However, while in FIG. 1 the motor control at the GUI 140 is indicated as being not disabled, it is understood that motor control via the GUI 140 may be enabled and/or available only after the camera 110 is removed from the packaging 104.

While not depicted the GUI 140 may further include a window to show images received from the camera 110 when the computing device 106 is connected to the apparatus 102 via the connectors 114, 134.

The computing device 106 may further comprise one or more input devices 142 (e.g., as depicted a keyboard and a pointing device and/or a mouse), for controlling and/or interacting with the GUI 140.

However, due to the automatic homing process that may occur when the computing device 106 is connected to the apparatus 102, and supplies power thereto, the controller 118 is generally configured to, for example by executing the one or more applications 122 (e.g., other than any VAEs): after receiving power via the connector 114, receive, from the one or more sensors 116, sensor data indicative of whether or not the camera 110 is inside packaging 104; determine, from the sensor data, that camera 110 is inside packaging 104; and in response to determining, from the sensor data, that the camera 110 is inside packaging 104, disable the one or more motors 112 from moving the camera 110. Such functionality is described in more detail with respect to FIG. 4, FIG. 5, FIG. 6 and FIG. 7.

For example, the sensors 116-1 may comprise one or more image sensors of the camera 110, and/or the sensors 116-1 may comprise an infrared image sensor of the camera 110. Such image sensors may include, but are not limited to, a CCD (charge-coupled device) a CMOS (complementary metal-oxide semiconductor), and the like.

In some examples an image sensor and an infrared sensor of the camera 110 may be combined into one image sensor that may be configured to acquire images at wavelengths visible to humans and at infrared wavelengths. For example wavelengths visible to humans may be in a range of about 380 nm to about 750 nm, and infrared wavelengths may include near infrared wavelengths in a range of about 750 nm to about 1400 nm, though alternatively, or in addition, such an image sensor of the camera 110 may be configured to acquire images at mid infrared wavelengths (e.g., in a range of about 1400 nm to about 3000 nm) and/or far infrared wavelengths (e.g., in a range of about 3000 nm to about 10000 nm).

In some examples, a sensor 116-1 may comprise an image sensor of the camera 110, and the camera 110 may be placed in a visible imaging mode (e.g., where images in a human visible wavelength range are acquired by the image sensor), or an infrared imaging mode (e.g., where images in an infrared wavelength range are acquired by the image sensor). In some of these examples, the visible imaging mode may be a default mode of the image sensor of the camera 110.

Furthermore, while the apparatus 102 is described herein as including only one camera 110, the apparatus 102 may comprise a plurality of cameras 110 (e.g., a visible wavelength camera and an infrared camera, amongst other possibilities).

In these examples, and as also depicted in FIG. 1 and FIG. 2, the packaging 104 may be provided with a tag 144 that includes a predetermined pattern (e.g., as depicted the text "IN BOX"), and the tag 144 may be positioned at an inner side of the packaging 104, at a location that is in a field of view of the camera 110 when the apparatus 102 is in the packaged configuration (e.g. as best seen in FIG. 2). For example, as best seen in FIG. 2, the tag 144 is positioned at an inner side of the top portion 108 of the packaging 104, at a location that is in a field of view of the camera 110 when the apparatus 102 is in the packaged configuration. However, the apparatus 102 and the tag 144 may be packaged in any suitable manner that enables the tag 144 to be positioned at a location in the packaging 104 that is in a field of view of the camera 110 when the apparatus 102 is in the packaged configuration.

In these examples, the one or more sensors 116-1 may comprise an image sensor of the camera 110, and sensor data may comprise an image (e.g., in a human visible wavelength range and/or an infrared wavelength range) of the predetermined pattern that is indicative of the camera 110 being inside the packaging 104. Put another way, when the camera 110 of the apparatus 102 acquires images of the text "IN BOX" of the tag 144, and the images are processed by the controller 118, the controller 118 may determine that the apparatus 102 is located in the packaging 104 due to the text "IN BOX" appearing in the images; the controller 118 may hence responsively disable the motors 112 from moving the camera 110. Put yet another way, when the camera 110 of the apparatus 102 acquires an image of the text "IN BOX" of the tag 144, and the image is processed by the controller 118, the controller 118 may determine that the apparatus 102 is located in the packaging 104, and responsively stop and/or interrupt and/or fail to perform the aforementioned homing process by disabling the motors 112.

While the predetermined pattern of the tag 144 is depicted as the text "IN BOX", a predetermined pattern of the tag 144 may be any suitable pattern, that may include, but is not limited to, one or more of predetermined text, a predetermined image, a predetermined bar code, a predetermined QR (quick response) code, and the like, amongst other possibilities. Regardless, it is understood that, in these examples, the controller 118 is generally configured to determine when an image acquired by an image sensor of the camera 110 includes the predetermined pattern. For example, when the controller 118 is implementing a VAE in the form of a machine learning algorithm, a classifier corresponding to the predetermined pattern may be preconfigured at the controller 118, for example via being stored at the memory 120 and/or at one or more of the applications 122, such that the controller 118 may be configured, via the machine learning algorithm processing the classifier and images from the camera 110, to determine when the images from the camera 110 include the predetermined pattern. Furthermore, having determined that the images from the camera 110 include the predetermined pattern, the controller 118 may disable the motors 112.

In other examples, one or more of the one or more sensors 116 may comprise a wireless identification sensor, which may include, but is not limited to, a radio frequency identification (RFID) sensor and a near field communication (NFC) sensor. In these examples, the packaging 104 may be provided with a wireless identification tag 146, which may include, but is not limited to, an RFID tag and an NFC tag, at which is stored an identifier indicative of the apparatus 102 being in the packaging 104, that may include, but is not limited to, a predetermined sequence of letters and/or numbers that the controller 118 has been preconfigured to recognize. For example, such an identifier may be preconfigured at the controller 118, for example via being stored at the memory 120 and/or at one or more of the applications 122, such that the controller 118 may be configured, via the identifier being received as wireless identification data from the wireless identification tag 146, via an RFID sensor and/or an NFC sensor, to determine when the wireless identification data includes the identifier. Furthermore, having determined that the wireless identification data includes the identifier, the controller 118 may disable the motors 112.

In yet further examples, one or more sensors 116 may comprise a position sensor, for example that measures a position of the camera 110. For example, a motor 112 may comprise a stepper motor and a sensor 116 may comprise an encoder that reads and/or determines a position of such a stepper motor. In these examples, the controller 118 may, in response to receiving the power via the connector 114, and prior to disabling the one or more motors 112, control a motor to move the camera 110 by a given distance, and sensor data received from the encoder may comprise an indication of a distance moved by the camera 110, that may be different from the given distance. In these examples, when the sensor data indicates that the distance moved by the camera 110 is below the given distance, the controller 118 may determine that the camera 110 is inside the packaging 104. Put another way, in these examples, when the controller 118 controls a motor 112 to move the camera 110 by a given distance, for example of 2°, 3°, 4°, amongst other possibilities, for example to pan and/or tilt the camera 110 etc., the motor 112 may not be able to move the camera 110 by the given distance because movement of the camera 110 may be restricted by the packaging 104. Hence, when sensor data received from the encoder indicates that the camera 110 moved a distance less than the given distance, the controller 118 may determine that the camera 110 is in the packaging 104 and disable the one or more motors 112. In particular, the given distance may be predetermined and stored at the memory 120 and/or at the one or more applications 122, and may be selected to be a distance that won't cause damage to the camera 110 and/or the packaging 104 when resistance is encountered due to the packaging 104, when attempting to move the camera 110. Hence, while examples of the given distance may be 2°, 3°, 4°, amongst other possibilities, the given distance may be selected heuristically, and may depend on a type of the packaging 104 (e.g., paper and/or polystyrene foam, or harder packaging materials, such as hard plastics, and the like), heuristically determined fragility of the camera 110, amongst other possibilities. Furthermore, while the given distance is provided in units of degrees, the given distance may be in any suitable units, including, but not limited to, a number of steps of a stepper motor, and the like.

In yet further examples, one or more of sensors 116 may comprise a tamper switch sensor. In these examples, and as best seen in FIG. 1 and FIG. 2 the packaging 104 may be provided with a tamper switch 148. In particular, in FIG. 1, the tamper switch 148 is depicted in one piece in an untampered state, for example, being along the top portion 108 of the packaging 104, and a side of the packaging 104 adjacent to the top portion 108. In contrast, FIG. 2 depicts the tamper switch 148 in a tampered state, in two pieces, when the top portion 108 is removed from the remainder of the packaging 104. In some examples, once the tamper switch 148 enters the tampered state (e.g., and is in two pieces), the tamper switch 148 may not be able to re-enter the untampered state.

In particular, the tamper switch 148 may be configured to provide a first tamper wireless signal when the tamper switch 148 is in an untampered state, and a second tamper wireless signal when the tamper switch 148 is in a tampered state; such signals may comprise NFC signals. Accordingly, a tamper switch sensor may comprise an NFC sensor and when the controller 118 receives, via the tamper switch sensor, the first tamper wireless signal, the controller 118 may determine that the camera 110 is in the packaging 104, and disable the one or more motors 112 accordingly. An indication of the tamper wireless signals may be stored at the memory 120 and/or at one or more of the applications 122 so that the controller 118 is generally configured to determine when a wireless signal received from the tamper switch 148 is the first tamper wireless signal or the second tamper wireless signal.

However, the tamper switch 148 may alternatively be connected to one or more of the sensors 116 (e.g., a sensor 116-2) via a wire, and a wired tamper switch 148 may be configured to provide a first tamper signal when the tamper switch 148 is in an untampered state, and a second tamper signal when the tamper switch 148 is in a tampered state. Accordingly, when the controller 118 receives, via a wired tamper switch sensor, the first tamper signal, the controller 118 may determine that the camera 110 is in the packaging 104, and disable the one or more motors 112 accordingly. An indication of the signals may be stored at the memory 120 and/or at one or more of the applications 122 so that the controller 118 is generally configured to determine when a wireless signal received from the tamper switch 148 is the first tamper wireless signal or the second tamper wireless signal.

The tamper switch 148 may furthermore be mechanical and located such that the camera 110 is placing pressure on a mechanical tamper switch when the apparatus 102 is in the package 104, and such pressure is relieved when the camera 110 is removed from the package 104. In these examples, a mechanical tamper switch provides (e.g., in a wired and/or wireless manner) a first tamper signal to the controller 118 when pressure on the mechanical tamper switch, indicating the mechanical tamper switch is in an untampered state, and the mechanical tamper switch provides (e.g., in a wired and/or wireless manner) a second tamper signal to the controller 118 when pressure on the mechanical tamper switch is relieved, indicating the mechanical tamper switch is in a tampered state. The controller 118 may determine that the camera 110 is in the packaging 104, or not in the packaging 104 accordingly, and disable, or not, the one or motors 112 accordingly.

In yet further examples, the one or more sensors 116 may comprise a plurality of sensors comprising two or more of: an image sensor of the camera 110; an infrared image sensor of the camera 110; an accelerometer; a magnetometer; a position sensor; a temperature sensor, amongst other possibilities. Indeed, in these examples, the various tags 144, 146 and/or the tamper switch 148 may not be present at the packaging 104. In these examples, sensor data received by the controller 118 may comprise a combination of respective sensor data from such a plurality of sensors, and the combination of the respective sensor data may be indicative of the camera 110 being inside the packaging 104. Put another way, certain combinations of visible images and/or infrared images and/or accelerometer data and/or magnetometer data and/or temperature data and/or position data may indicate that the camera 110 is in the packaging 104; such combinations may be heuristically determined and indications of such combinations may be stored at the memory 120 and/or at one or more of the applications 122. For example, when visible images and/or infrared images comprise a color that corresponds to a given color (e.g., such as black or brown), in combination with a given temperature being above a given temperature (e.g., such as 25° C., 26° C., 27° C., amongst other possibilities, and/or in combination with accelerometer data and/or magnetometer data indicating the camera 110 is in a given position (e.g., face up as depicted in FIG. 1), the controller 118 may determine that the camera 110 is in the packaging and disable the one or more motors 112 accordingly.

It is further understood that, in some examples where a sensor 116 comprises a tamper switch sensor that communicates with the tamper switch 148 that enters a tampered state when the top portion 108 is removed, and which may not be able to re-enter the untampered state when the top portion 108 is placed back on the remainder of the packaging 104, at least a second type of sensor 116 may be relied upon to determine whether the apparatus 102 is in the packaging 104. In such examples, it is understood that the top portion 108 may be removed from the remainder of the packaging 104 for a shipping inspection, causing the tamper switch 148 to enter the tampered state, and hence when the top portion 108 is placed back on the packaging 104, the tamper switch 148 may provide a false negative of the apparatus 102 not being in the packaging 104.

Attention is again directed to FIG. 3 and certain further aspects of the structure of the apparatus 102 are next described.

For example, the controller 118 may include one or more logic circuits, one or more processors, one or more microprocessors, one or more GPUs (Graphics Processing Units), and/or the controller 118 may include one or more ASIC (application-specific integrated circuits) and one or more FPGA (field-programmable gate arrays), and/or another electronic device. In some examples, the controller 118 and/or the apparatus 102 is not a generic controller and/or a generic device, but a device specifically configured to implement functionality for disabling motors that move a camera. For example, in some examples, the apparatus 102 and/or the controller 118 specifically comprises a computer executable engine configured to implement functionality for disabling motors that move a camera.

The static memory 120 comprises a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 3, programming instructions (e.g., machine readable instructions) that implement the functionality of the apparatus 102 as described herein are maintained, persistently, at the memory 120 and used by the controller 118, which makes appropriate utilization of volatile storage during the execution of such programming instructions.

Figure 4:
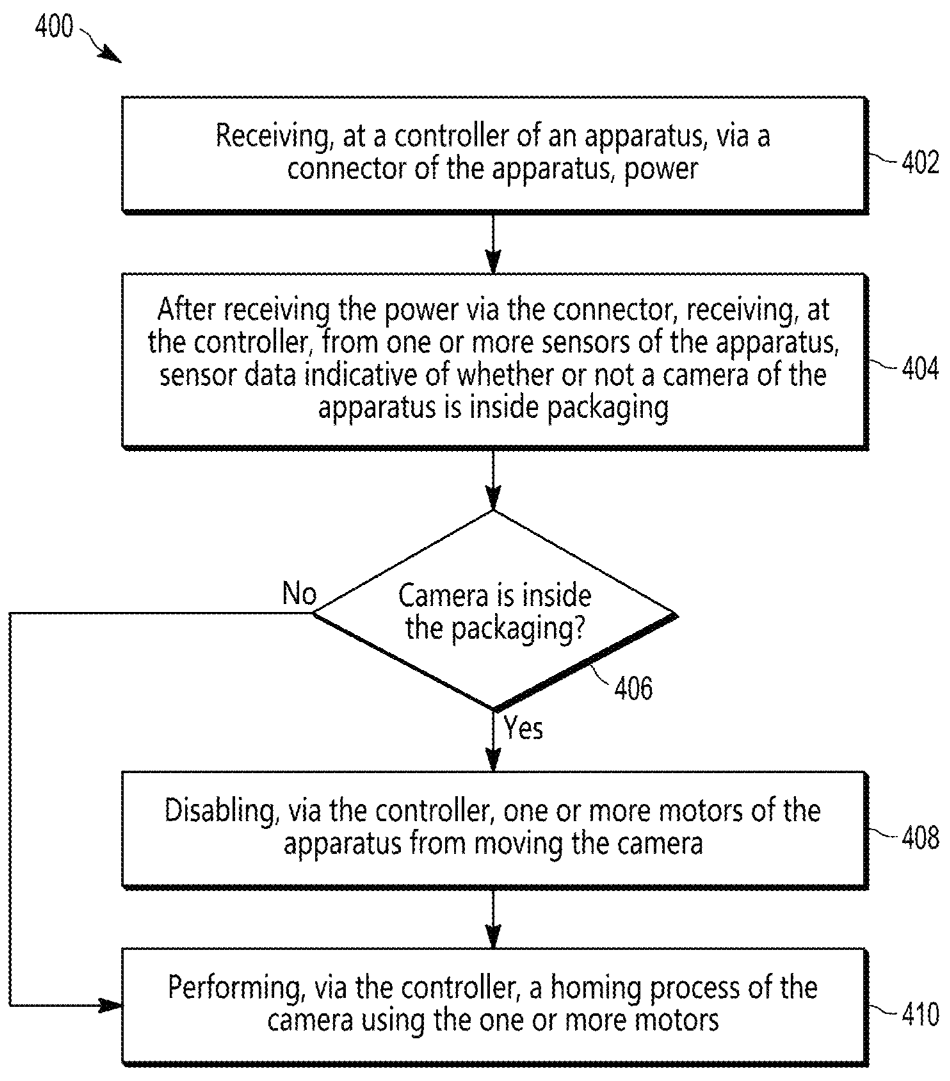
FIG. 4 is a flowchart of a method for disabling motors that move a camera, in accordance with some examples.

In particular, the memory 120 stores instructions and/or program code and/or a set of instructions corresponding to the at least one application 122 that, when executed by the controller 118, enables the controller 118 to implement functionality for disabling motors that move a camera, including but not limited to, the blocks of the method set forth in FIG. 4.

Put another way, the memory 120 may comprise a (e.g., non-transitory) computer-readable storage medium having stored thereon program instructions that, when executed by the controller 118, cause the controller 118 to perform a set of operations comprising the blocks of the method set forth in FIG. 4.

While components of the computing device 106 are not depicted, the computing device 106 may have a structure similar to that of the apparatus 102, but adapted for respective functionality of the computing device 106, for example to implement the GUI 140, configure the apparatus 102 via the connector 134, and provide power via the connector 134.

Attention is now directed to FIG. 4, which depicts a flowchart representative of a method 400 for disabling motors that move a camera. The operations of the method 400 of FIG. 4 correspond to machine readable instructions that are executed by the controller 118 and/or apparatus 102. In the illustrated example, the instructions represented by the blocks of FIG. 4 are stored at the memory 120 for example, as the application(s) 122. The method 400 of FIG. 4 is one way in which the controller 118 and/or the apparatus 102 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as “blocks” rather than “steps.” The method 400 of FIG. 4 may be implemented on variations of the system 100 of FIG. 1, as well.

At a block 402, the controller 118, and/or the apparatus 102, receives, at the controller 118 of the apparatus 102, via the connector 114 of the apparatus 102, power.

Put another way, the controller 118, and/or the apparatus 102 may automatically turn on when power is received.

At a block 404, the controller 118, and/or the apparatus 102, after receiving the power via the connector 114, receives, from one or more sensors 116 of the apparatus 102, sensor data indicative of whether or not the camera 110 of the apparatus is inside the packaging 104.

At a block 406, the controller 118, and/or the apparatus 102, determines, from the sensor data, whether or not the camera 110 is inside the packaging 104.

In response to the controller 118, and/or the apparatus 102, determining, from the sensor data, that the camera 110 is inside the packaging 104 (e.g., a “YES” decision at the block 406), at a block 408, the controller 118, and/or the apparatus 102, disables the one or more motors 112 of the apparatus 102 from moving the camera 110.

However, in response to the controller 118, and/or the apparatus 102, determining, from the sensor data, that the camera 110 is not inside the packaging 104 (e.g., a “NO” decision at the block 406), at a block 410, the controller 118, and/or the apparatus 102, performs a homing process of the camera 110 using the one or more motors 112. For example, such a homing process may include, but is not limited to, positioning the camera 110 at associated zero and/or home positions for panning, tilting and zooming.

The method 400 may include other features.

For example, the one or more sensors 116 may comprise an image sensor of the camera 110, and the sensor data of the block 404 may comprise an image of a predetermined pattern indicative of the camera 110 being inside the packaging 104.

Alternatively, or in addition, the one or more sensors 116 may comprise an infrared image sensor of the camera 110, and the sensor data of the block 404 may comprise an infrared image of a predetermined pattern indicative of the camera 110 being inside the packaging 104.

In examples where an image sensor of the camera 110 may initially be in a visible imaging mode (e.g., a default mode), the method 400 may further comprise the controller 118 and/or the apparatus 102: after receiving the power at the block 402, enabling the infrared image sensor of the camera 110, for example to place the camera 110 into an infrared imaging mode, for example from the default visible imaging mode. In such an example, the camera 110 may be placed into an infrared imaging mode on the assumption that it is dark inside the packaging 104 and a predetermined pattern of the tag 144 may be imageable by the camera 110 in the infrared imaging mode, but may not be imageable by the camera 110 in the default visible imaging mode.

Alternatively, or in addition, the one or more sensors 116 may comprise a position sensor, the sensor data may comprise an indication of a distance moved by the camera 110, and the method 400 may further comprise the controller 118 and/or the apparatus 102: in response to receiving the power (e.g., at the block 402), and prior to disabling the one or more motors 112 (e.g., at the block 408), controlling the one or more motors 112 to move the camera 110 by a given distance; and when the sensor data indicates that a distance moved by the camera 110 is below the given distance, determining that the camera 110 is inside the packaging 104. The controller 118 and/or the apparatus 102 responsively disables the motors 112 at the block 408.

Alternatively, or in addition, the one or more sensors 116 may comprise a wireless identification sensor, and the sensor data (e.g., of the block 404) may comprise wireless identification data indicative of the camera 110 being inside the packaging 104. In these examples, a wireless identification sensor may comprise one or more of a radio frequency identification (RFID) sensor, a near field communication (NFC) sensor, and the like.

Alternatively, or in addition, the one or more sensors 116 may comprise a tamper switch sensor, and the sensor data (e.g., of the block 404) may comprise tamper switch data indicative of the camera 110 being inside the packaging 104.

Alternatively, or in addition, the one or more sensors 116 may comprise a plurality of sensors 116 comprising two or more of: an image sensor of the camera 110; an infrared image sensor of the camera 110; an accelerometer; a magnetometer; a position sensor; and a temperature sensor. In these examples, the sensor data may comprise a combination of respective sensor data from the plurality of sensors 116, and the combination of the respective sensor data may be indicative of the camera 110 being inside the packaging 104.

In yet further examples, the connector 114 may be further to connect to the computing device 106 external to the apparatus 102, and the method 400 may further comprise the controller 118 and/or the apparatus 102: providing, via the connector 114, to the computing device 106, a command to disable motor control at a user interface (e.g., such as the GUI 140) provided by the computing device 106. For example, the controller 118 and/or the apparatus 102 may provide a command to the computing device 106 to disable the camera controls of “Pan”, “Tilt” and “Zoom” of the GUI 140. Such a command to disable motor control at a user interface may be provided in response to the controller 118 and/or the apparatus 102 determining (e.g., a “YES” decision at the block 406), that the camera 110 is in the packaging 104.

Figure 5:
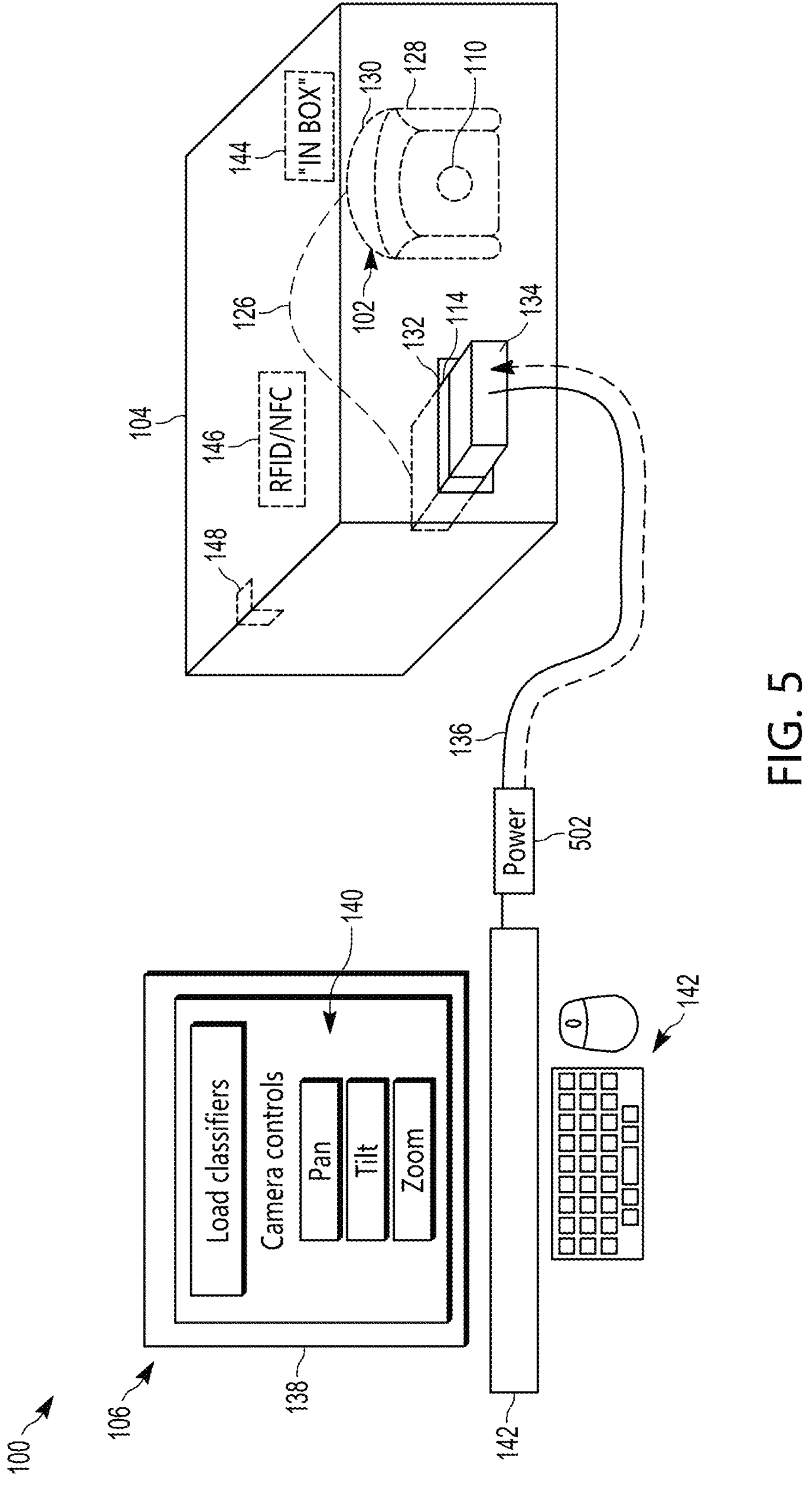
FIG. 5 depicts the system of FIG. 1 implementing a method for disabling motors that move a camera, in accordance with some examples.
Figure 6:
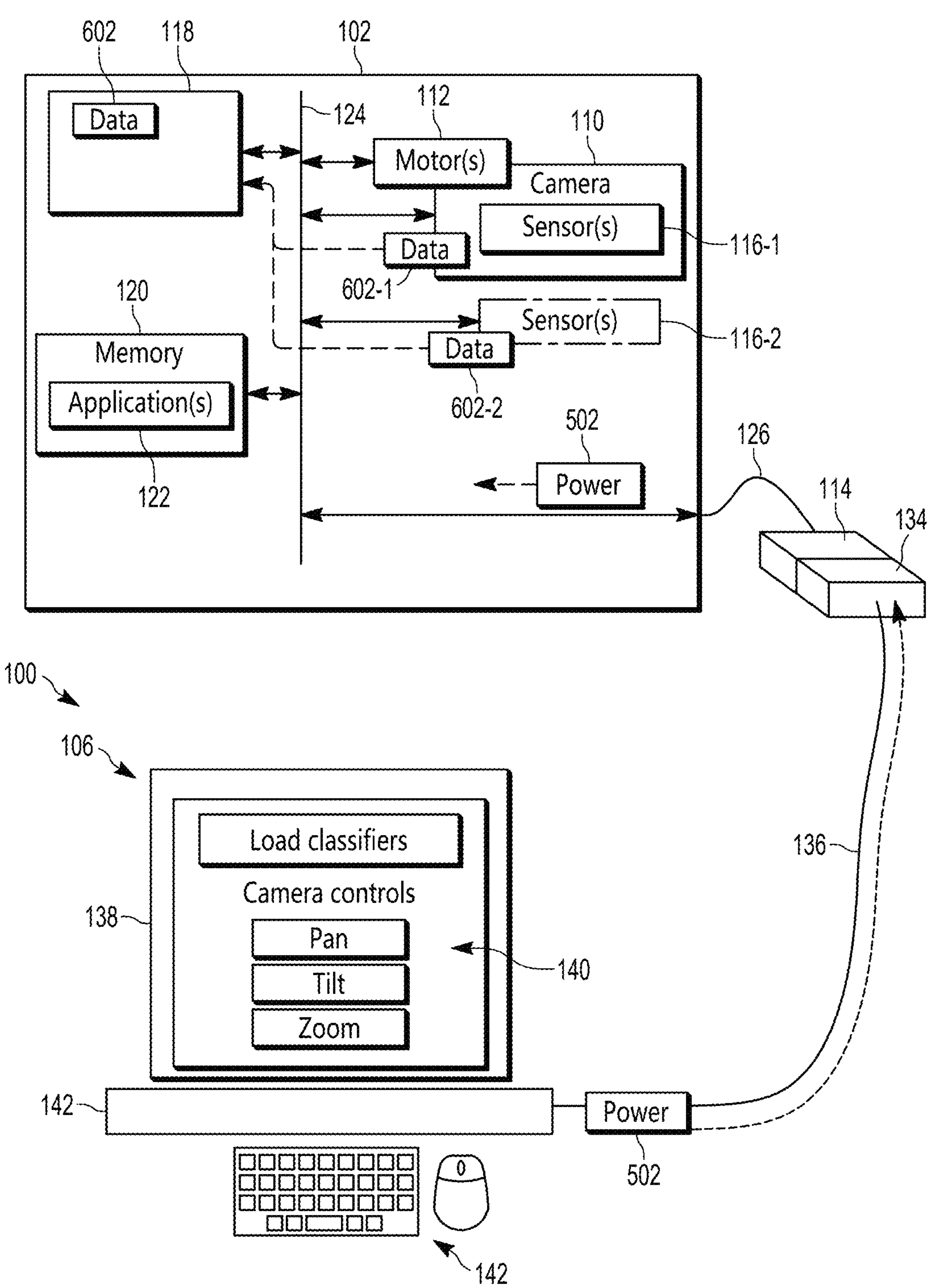
FIG. 6 depicts the system of FIG. 1 continuing to implement a method for disabling motors that move a camera, in accordance with some examples.
Figure 7:
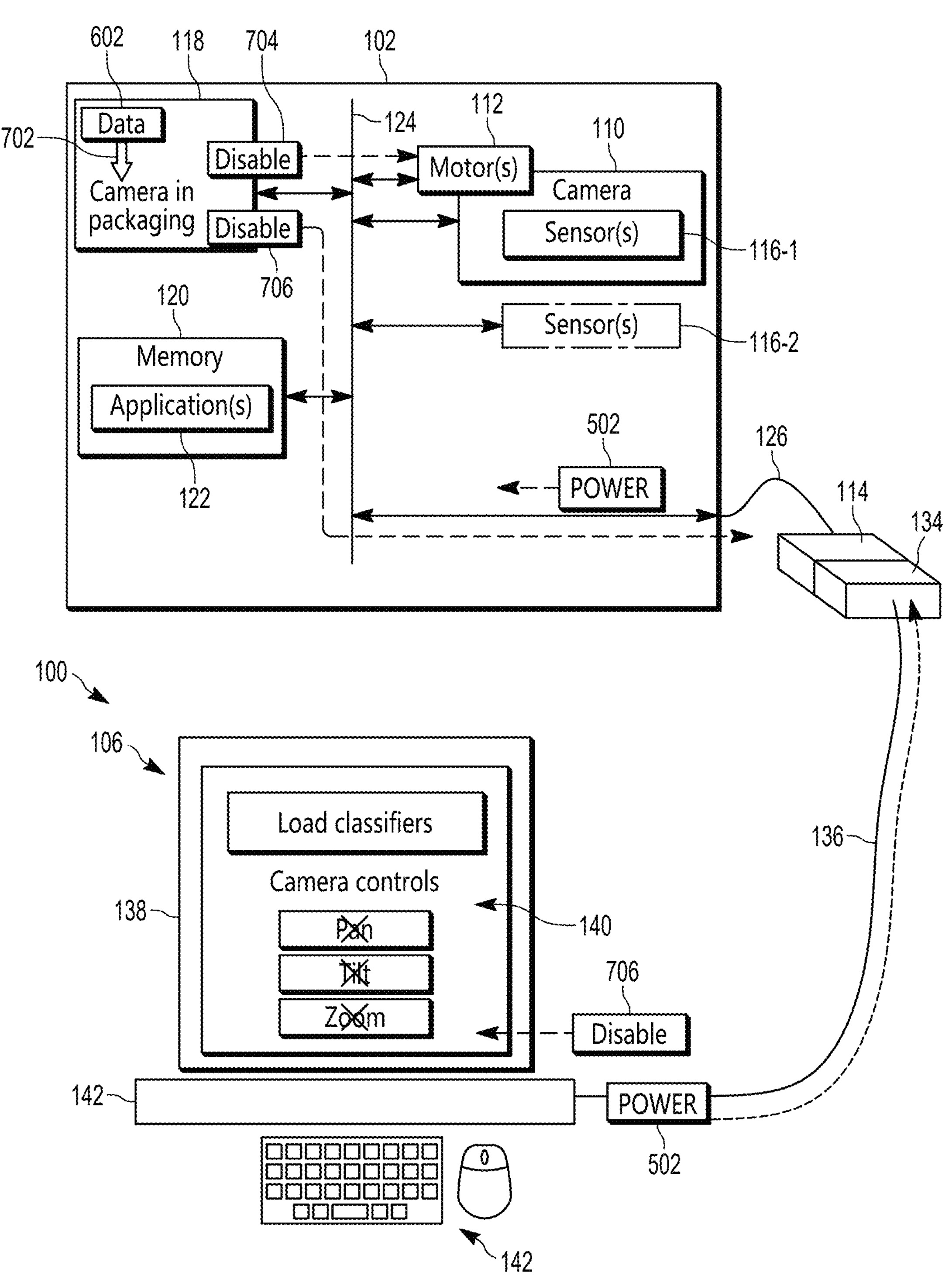
FIG. 7 depicts the system of FIG. 1 continuing to implement a method for disabling motors that move a camera, in accordance with some examples.

Aspects of the method 400 are next described with respect to FIG. 5, FIG. 6, and FIG. 7, depict the apparatus 102 and computing device 106 of FIG. 1, FIG. 2 and FIG. 3 in various configurations, with like components having like numbers.

Attention is first directed to FIG. 5, which depicts the apparatus 102 in the packaging 104, similar to as depicted in FIG. 1, and the computing device 106, also similar to as depicted in FIG. 1. In particular, the connectors 114, 134 have been connected such that the computing device 106 is providing power 502 to the apparatus 102. It is understood in these examples that the computing device 106 includes a power source, such as a connection to a mains power supply, and/or a battery, and the like, from which the power 502 may be provided. In this configuration it is further understood that the apparatus 102 and the computing device 106 may communicate with each other via the connectors 114, 134.

However, in other examples, the power 502 may be provided from a power source other than the computing device 106. Put another way, while present examples of the method 400 are described with respect to the computing device 106 both providing the power 502 and configuring the apparatus 102, in other examples, the method 400 may be implemented when power is provided to the apparatus 102, via the connector 114, from any suitable power source, which may, or may not, include scenarios where the apparatus 102 is being configured.

Attention is next directed to FIG. 6, which depicts the apparatus 102, similar to as depicted in FIG. 3, connected to the computing device 106 via the connectors 114, 134. As depicted, the power 502 is received (e.g., at the block 402 of the method 400) at the apparatus 102, and the apparatus 102 may hence turn on. Indeed, it is understood that the controller 118 also turns on when the power 502 is received.

However, rather than the controller 118 automatically implementing a homing process in response to receiving the power 502 and/or being turned on, the controller 118 receives (e.g., at the block 404 of the method 400) sensor data 602-1 from one or more of the sensors 116-1, and/or the controller 118 receives sensor data 602-2 from one or more of the sensors 116-2. The sensor data 602-1, 602-2 is interchangeably referred to hereafter, collectively and/or generically, as the sensor data 602. Such receipt of the sensor data 602 may occur automatically. Alternatively, or in addition, such receipt of the sensor data 602 may occur upon the controller 118 querying one or more of the sensors 116. Alternatively, or in addition, such receipt of the sensor data 602 may occur upon the controller 118 controlling an image sensor, and/or an infrared image sensor, of the camera 110 to acquire an image and/or an infrared image. Alternatively, or in addition, such receipt of the sensor data 602 may occur upon the controller 118 controlling an RFID and/or NFC sensor, to acquire wireless identification data. Alternatively, or in addition, such receipt of the sensor data 602 may occur upon the controller 118 controlling the camera 110, via controlling a motor 112, to move through a given distance and reading the distance moved via an encoder.

Regardless, the sensor data 602 is received at the controller 118 and is processed by the controller 118.

For example, with attention directed to FIG. 7, the controller 118 determines (e.g., a "YES" decision at a block 406 of the method 400) that the sensor data 602 is indicative of the camera 110 being in the packaging 104, as represented by an arrow 702 and the text "Camera in Packaging". For example, the sensor data 602 may comprise an image from the camera 110 that may depict the text "IN BOX", and the controller 118 may determine that the camera 110 is in the packaging 104 upon determining that the image from the camera 110 comprises the predetermined pattern of the text "IN BOX".

In response to determining, from the sensor data 602, that the camera 110 is in the packaging 104 (e.g., a "YES" decision at a block 406 of the method 400), the controller 118 disables (e.g., at the block 408 of the method 400) the motors 112 by providing to the motors 112 a disable command 704. The disable command 704 may disable and/or lock the motors 112 such that the camera 110 does not and/or cannot move while in the packaging 104, at least while the power 502 is being received. Furthermore, the controller 118 determining, from the sensor data 602, that the camera 110 is in the packaging 104 causes the controller 118 to refrain from implementing the aforementioned homing process.

As also depicted in FIG. 7, the controller 118 provides, via the connectors 114, 134, to the computing device 106, a command 706 to disable motor control at a user interface provided by the computing device 106, and more specifically the command 706 is to disable motor control at the GUI 140. The command 706 may be provided in response to the controller 118 and/or the apparatus 102 determining that the camera 110 is in the packaging 104 (e.g., a "YES" decision at a block 406 of the method 400). The command 706 is provided to the computing device 106 via the connectors 114, 134.

The computing device 106 is understood to receive and process the command 706 and responsively disable the motor control at the GUI 140, for example by disabling the electronic camera controls that control the camera 110 to "Pan", "Tilt" and "Zoom". Such disabling of the electronic camera controls is represented in FIG. 7 as a respective "X" through each of the electronic camera controls "Pan", "Tilt" and "Zoom". It is understood that such electronic camera controls may be reenabled when the connectors 114, 134 are disconnected (e.g., even though actuation thereof may not result in any motor control due to the disconnection), and/or such electronic camera controls may be reenabled when the controller 118 later determines that the apparatus 102 is not in the packaging 104. Furthermore, such disabling of the motor control at the GUI 140 indicates that the motors 112 are not able to be controlled due to the motors 112 being disabled. Put another way, while in FIG. 1, FIG. 5, and FIG. 6 the motor control at the GUI 140 is indicated as being not disabled, it is understood that motor control via the GUI 140 may be enabled only after the camera 110 is removed from the packaging 104.

Furthermore, when the power 502 is no longer received at the apparatus 102, and/or the apparatus 102 is turned off, the motors 112 may automatically be placed in an enabled state and/or unlock for a next time the apparatus 102 receives power and/or is turned on, and/or the motors 112 may remain in a disabled state and/or locked. Regardless, a next time the apparatus 102 receives power and/or is turned on, the method 400 may again be implemented, and the motors 112 may again be disabled and/or locked via the command 704, and/or the command 704 may cause the motors 112 to remain in a disabled state and/or locked, or the motors 112 may be enabled and/or unlocked, and controlled to perform the homing process (e.g., when a "NO" decision occurs at the block 406, and the block 410 is implemented).

It is furthermore understood that while disabling of the motors 112 has been described herein when the camera 110 is detected inside the packaging 104, such a disabling of the motors 112 may be a component of an alternative method of controlling a start up process at the apparatus 102.

For example, such a method may include, but is not limited to, receiving, at the controller 118 of the apparatus 102, via the connector 114 of the apparatus 102, power; after receiving the power via the connector 114, receiving, at the controller 118, from one or more sensors 116 of the apparatus 102, sensor data indicative of whether or not a camera 110 of the apparatus 102 is inside packaging 104; determining, at the controller 118, from the sensor data, that the camera 110 is inside the packaging 104; and in response to determining, at the controller 118, from the sensor data, that the camera 110 is inside the packaging 104, disabling at least one or more start-up processes of the apparatus 102 and/or changing a start-up process of the apparatus 102 from a full start-up process to a limited start-up process in which one or more processes of the full start-up process are not implemented and/or are disabled. For example, the full start-up process may include, but is not limited to, enabling the motors 112 and performing a homing process of the camera 110, as has been described herein, as well as testing a sensor of the camera 110, and/or other components of the apparatus 102, such as performing a power-on self-test, and the like. In contrast, a limited start-up process may include, but is not limited to, not enabling the motors 112, not performing the homing process, not testing a sensor of the camera 110, and the like, though such a limited start-up process may allow for manual control of testing a sensor of the camera 110, for example via the GUI 140, and placing the apparatus 102 in a state where the apparatus 102 may be configured via the GUI 140.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot process sensor data, cannot disable motors, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contain . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, at a controller of an apparatus, via a connector of the apparatus, power;

after receiving the power via the connector, receiving, at the controller, from one or more sensors of the apparatus, sensor data indicative of whether or not a camera of the apparatus is inside packaging;

determining, at the controller, from the sensor data, that the camera is inside the packaging; and in response to determining, at the controller, from the sensor data, that the camera is inside the packaging, disabling one or more motors of the apparatus from moving the camera, wherein the one or more sensors comprises a position sensor, and wherein the method further comprises:

in response to receiving the power, and prior to disabling the one or more motors, controlling the one or more motors to move the camera by a given distance, the sensor data comprising an indication of a distance moved by the camera; and when the sensor data indicates that the distance moved by the camera is below the given distance, determining that the camera is inside the packaging.

2. The method of claim 1, wherein the one or more sensors comprises an image sensor of the camera, and wherein the sensor data comprises an image of a predetermined pattern indicative of the camera being inside the packaging.

3. The method of claim 1, wherein the one or more sensors comprises an infrared image sensor of the camera, and wherein the sensor data comprises an infrared image of a predetermined pattern indicative of the camera being inside the packaging.

4. The method of claim 3, further comprising: after receiving the power, enabling the infrared image sensor of the camera.

5. The method of claim 1, wherein the one or more sensors comprises a wireless identification sensor, and wherein the sensor data comprises wireless identification data indicative of the camera being inside the packaging.

6. The method of claim 5, wherein the wireless identification sensor comprises one or more of a radio frequency identification (RFID) sensor and a near field communication (NFC) sensor.

7. The method of claim 1, wherein the one or more sensors comprises a tamper switch sensor, and wherein the sensor data comprises tamper switch data indicative of the camera being inside the packaging.

8. The method of claim 1, wherein the one or more sensors comprises a plurality of sensors comprising two or more of: an image sensor of the camera; an infrared image sensor of the camera; an accelerometer; a magnetometer; a position sensor; and a temperature sensor, wherein the sensor data comprise a combination of respective sensor data from the plurality of sensors, and wherein the combination of the respective sensor data is indicative of the camera being inside the packaging.

9. The method of claim 1, wherein the connector is further to connect to a computing device external to the apparatus, and wherein the method further comprises:

providing, via the connector, to the computing device, a command to disable motor control at a user interface provided by the computing device.

10. An apparatus comprising:

a camera;

one or more motors configured to move the camera;

a connector configured to receive power;

one or more sensors;

a controller communicatively coupled to the camera, the one or more motors, the connector, and the one or more sensors; and a computer-readable storage medium having stored thereon program instructions that, when executed by the controller, causes the controller to perform a set of operations comprising:

after receiving the power via the connector, receiving, from the one or more sensors, sensor data indicative of whether or not the camera is inside packaging;

determining, from the sensor data, that the camera is inside the packaging; and in response to determining, from the sensor data, that the camera is inside the packaging, disable the one or more motors from moving the camera, wherein the one or more sensors comprises a position sensor, and wherein the set of operations further comprises:

in response to receiving the power, and prior to disabling the one or more motors, controlling the one or more motors to move the camera by a given distance, the sensor data comprising an indication of a distance moved by the camera; and when the sensor data indicates that the distance moved by the camera is below the given distance, determining that the camera is inside the packaging.

11. The apparatus of claim 10, wherein the one or more sensors comprises an image sensor of the camera, and wherein the sensor data comprises an image of a predetermined pattern indicative of the camera being inside the packaging.

12. The apparatus of claim 10, wherein the one or more sensors comprises an infrared image sensor of the camera, and wherein the sensor data comprises an infrared image of a predetermined pattern indicative of the camera being inside the packaging.

13. The apparatus of claim 12, wherein the set of operations further comprises: after receiving the power, enabling the infrared image sensor of the camera.

14. The apparatus of claim 10, wherein the one or more sensors comprises a wireless identification sensor, and the sensor data comprises wireless identification data indicative of the camera being inside the packaging.

15. The apparatus of claim 14, wherein the wireless identification sensor comprises one or more of a radio frequency identification (RFID) sensor and a near field communication (NFC) sensor.

16. The apparatus of claim 10, wherein the one or more sensors comprises a tamper switch sensor, and wherein the sensor data comprises tamper switch data indicative of the camera being inside the packaging.

17. The apparatus of claim 10, wherein the one or more sensors comprises a plurality of sensors comprising two or more of: an image sensor of the camera; an infrared image sensor of the camera; an accelerometer; a magnetometer; a position sensor; and a temperature sensor, wherein the sensor data comprise a combination of respective sensor data from the plurality of sensors, and wherein the combination of the respective sensor data is indicative of the camera being inside the packaging.

18. The apparatus of claim 10, wherein the connector is further to connect to a computing device external to the apparatus, and wherein the set of operations further comprises:

providing, via the connector, to the computing device, a command to disable motor control at a user interface provided by the computing device.

* * * * *